July 8, 1941.   D. H. ANNIN   2,248,322
APPARATUS FOR INDICATING, CONTROLLING, AND RECORDING
THE LEVEL OF LIQUIDS IN VESSELS
Filed April 7, 1939   2 Sheets-Sheet 2
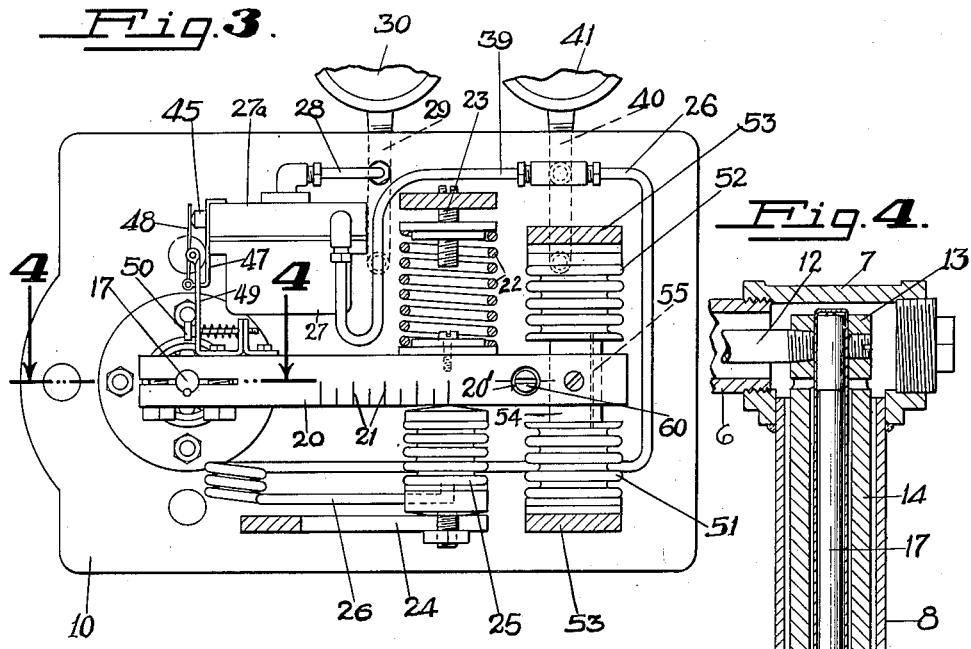
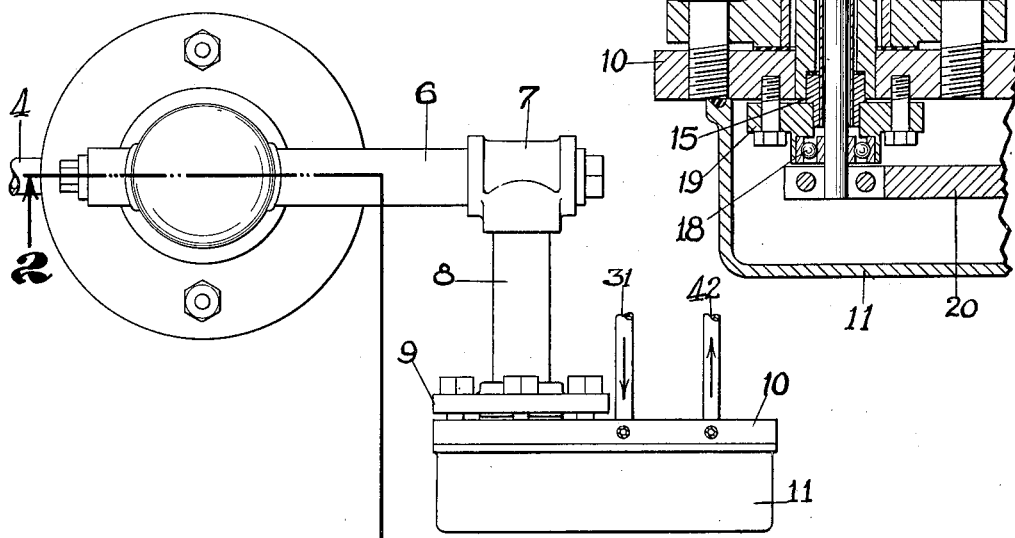
INVENTOR,
Douglas H. Annin
BY
J. E. Trabucco
ATTORNEY Patented July 8, 1941

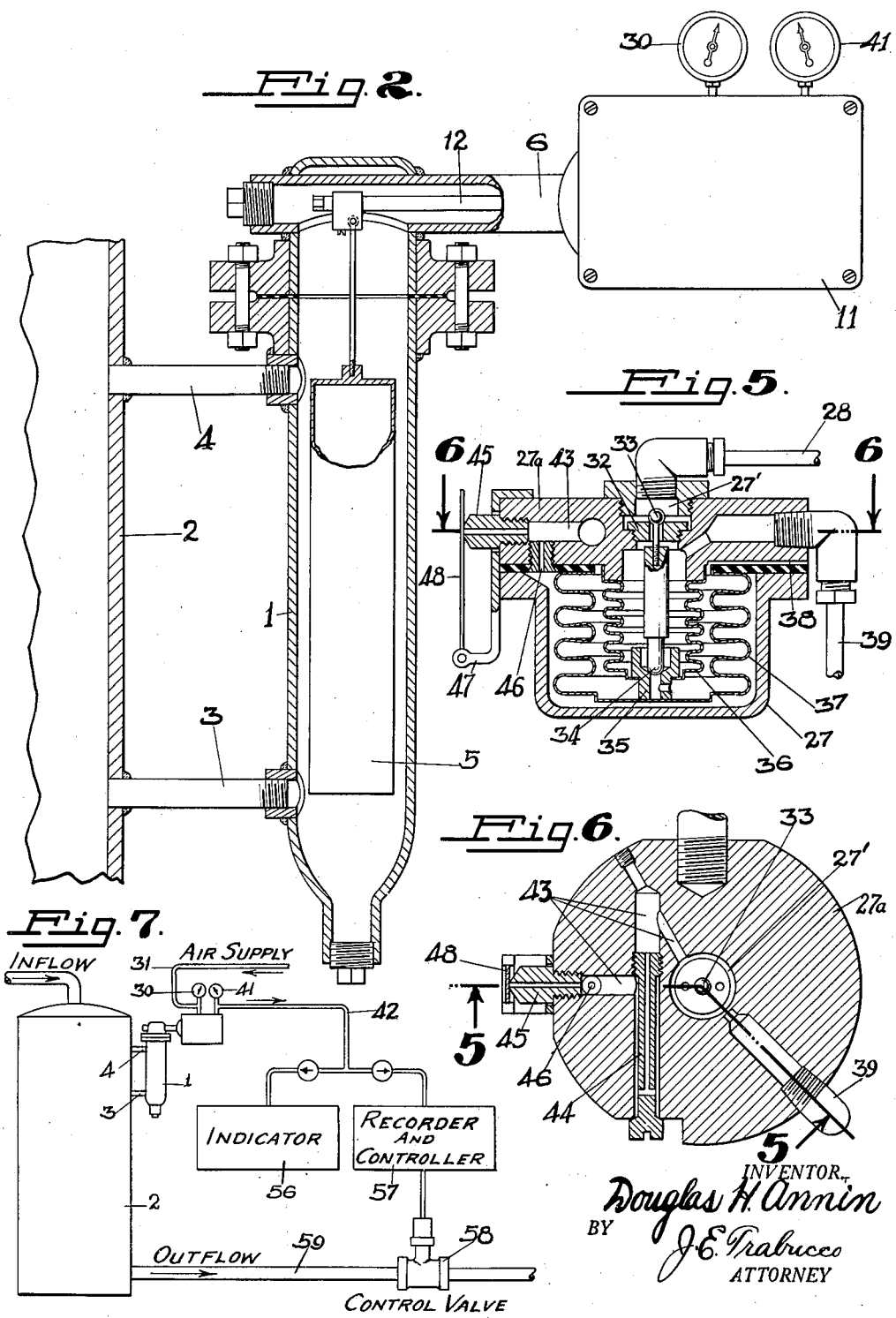

2,248,322

UNITED STATES PATENT OFFICE 2,248,322

APPARATUS FOR INDICATING, CONTROLLING, AND RECORDING THE LEVEL OF LIQUIDS IN VESSELS

Douglas H. Annin, San Francisco, Calif.

Application April 7, 1939, Serial No. 266,523

11 Claims. (Cl. 73—309)

This invention relates to improvements in apparatus for indicating, controlling and recording the liquid level of fluids in vessels.

The primary object of my invention is to provide improved apparatus for accurately indicating and controlling the liquid level of fluids in pressure vessels, and by means of which the conventional packing glands and the usual leakages accompanying their use have been entirely eliminated.

A further object of my invention is to provide improved apparatus of the type characterized which, by reason of the elimination of oils, greases or packing materials common to devices of the kind employing the conventional stuffing boxes, is capable of measuring the liquid levels of fluids containing corrosive or other ordinarily harmful acids.

Unlike certain other devices of this character, my invention employs a float or fluid displacing member of predetermined weight, and the fundamental operation of indicating or controlling the liquid level involves measuring the weight of the fluid displaced thereby. My device being sensitive to variations in respect to certain physical characteristics, as well as to changes in the fluid head of the liquid in which the float is immersed, readily adapts itself to use as an instrument for indicating, regulating and recording the specific gravity of liquids. By virtue of the novel construction of my improved apparatus, the mechanical measurements of the variations in the liquid level of fluids in a vessel, is accomplished with practically no appreciable mechanical movement of the measuring element. The entire measurement is capable of accomplishment by movements of but a few thousandths of an inch of the float, and as a consequence substantially all mechanical errors common to certain other types of measuring devices of this character are eliminated.

Other and further objects of my invention will be pointed out hereinafter or will be indicated in the appended claims, or will be obvious to one skilled in the art upon an understanding of the present disclosure. For the purpose of this application I have elected to show certain forms and details of apparatus for indicating, recording and controlling the levels of fluids in vessels representative of my invention; it is to be understood, however, that the embodiments of my invention herein shown and described are for the purpose of illustration only, and that therefore it is not to be regarded as exhaustive of the variations of the invention, nor is it to be given an interpretation such as might have the effect of limiting the claims, short of the true and most comprehensive scope of the invention in the art.

In the accompanying drawings:

Fig. 1 is a top plan view of apparatus embodying my invention;

Fig. 2 is a sectional view taken on the line 2—2 of Fig. 1;

Fig. 3 shows the side of the housing which normally encloses a part of the operating mechanism removed, and the said mechanism in elevation;

Fig. 4 is an enlarged sectional view taken on the line 4—4 of Fig. 3;

Fig. 5 is a sectional view of an air pilot device taken on the line 5—5 of Fig. 6;

Fig. 6 is a sectional view taken along the line 6—6 of Fig. 5; and

Fig. 7 is a diagrammatic illustration showing the general arrangement of an operating unit embodying my invention.

Referring to the drawings, the numeral 1 designates a vertically disposed cylinder, the interior of which is connected at points near its top and bottom to a liquid containing vessel 2 by pipes 3 and 4. Positioned in the cylinder 1 is an elongated float or fluid displacing member 5 having a predetermined weight. Suitably secured to the top end of the cylinder 1 is a horizontally disposed tube 6 which is connected by means of a hollow fitting 7 to one end of the tubular casing 8, the latter being disposed at right angles to the said tube and also preferably lying in a horizontal plane. The opposite end of the tubular casing 8 is welded or otherwise suitably secured to a collar 9 which is bolted to a vertically disposed parts supporting plate 10 having a housing 11 detachably secured thereto. The tube 6, the fitting 7, the tubular casing 8 and the housing 11 constitute a hollow rigid housing for certain operating parts of the apparatus. The float 5 is suspended from and flexibly connected to one end of a rod 12 which extends through the tube 6 and is secured at its other end to a fulcrum block 13 positioned inside the hollow fitting 7. The fulcrum block 13 is pivotally supported at one end of a stationary pipe 14, the walls of which are of considerable thickness, and capable of supporting the weight of various parts of the apparatus. The opposite end of the pipe 14 extends through a suitable opening in the supporting plate 10 and is tightly closed by a non-rotatable bushing 15. Rigidly secured to the fulcrum block 13 and at its other end to the bushing 15 is a thin-walled torsion tube 16 which is made preferably from a suitable metal having a certain amount of resiliency. The torsion tube is so secured within the bushing 15 that no fluid is allowed to leak from the interior of the pipe 8 into the housing 11.

Rotatably extending through the torsion tube 16 is a shaft 17 having one end rigidly secured to the end of said torsion tube which is positioned in and secured to the fulcrum block 13. The rotary shaft 17 projects from the open end of the torsion tube into the housing 11 and is rotatably mounted in bearings 18 which are supported by a flanged collar 19 bolted to the supporting plate 10. The collar 19 engages with the bushing 15 and serves to maintain it in a position whereby the end of the pipe 14 is tightly sealed.

Keyed to and securely clamped to that end of the shaft 17 which projects into the housing 11 is a substantially horizontal operating lever arm 20 having a plurality of graduation marks 21 arranged in predetermined positions thereon. Engaging with the upper side of the operating arm 20 is a compression spring 22 having adjustable screw means 23 for increasing or decreasing its downward pressure upon the said arm. The compression of the spring 22 may be suitably adjusted through the medium of the screw means 23 to counteract and absorb the suspended known weight of the float 5 and its connected parts.

Adjustably supported on a longitudinally slotted bar 24 which extends beneath the operating lever arm 20 is a bellows 25 having its upper end engaging with the underneath side of the said arm. The expansion of the bellows by a fluid being admitted thereto under pressure through a tube 26 causes an increased upward force to be exerted upon the operating lever arm 20. Due to the fact that the specific gravity of the fluids in the vessel 2 may vary in accordance wtih differences in their physical characteristics, the bellows 25 is adjustable toward or away from the shaft 17 or the point at which the latter is pivoted, thus reducing or increasing its mechanical advantage in order to compensate for the reduced or increased upward thrust of the float 5 when lighter or heavier fluids are being measured.

Secured to the parts supporting plate 10 is the casing 27 of a pilot control device, having a detachable top 27a. The top 27a of the casing 27 is provided centrally with a fluid intake opening 27' which is connected by a pipe 28 to a vertically drilled opening 29 provided in the supporting plate 10, the said last mentioned opening being connected at its upper end to a pressure gauge 30 and at its lower end to a fluid supply line 31. Positioned across the intake opening 27' is a disc 32 having a central opening therethrough which is controlled by a valve member 33. The valve member 33 is provided with a depending valve stem 34, the lower end of which is positioned to control the flow of the fluid through a tubular member 35. The upper end of the central opening in the tubular member 35 communicates with the interior of a small bellows 36 and the lower end of said opening communicates with the interior of a large bellows 37. The small bellows 36 provides a chamber therein which communicates through the central opening in the disc 32 with the casing's intake opening supplied with pilot pressure fluid by the pipe 28. Both of the bellows 36 and 37 at their lower ends are preferably secured to the tubular member 35, and at their upper ends to the top 27a of the casing 27. The interior of the large bellows is in communication through an opening 38 with the outer atmosphere. The interior of the small bellows 36 is connected by suitable channel means to an outlet pipe 39 which connects with the pipe 26 leading to the bellows 25 and also with a drilled vertical opening 40 provided in the parts supporting plate 10. The upper end of the opening 40 is connected to a gauge 41 for indicating the liquid level of the liquid in the vessel 2, and the lower end of said opening is connected to an outlet pipe 42. The top 27a of the casing 27 is suitably drilled to provide passageways 43, which, through an opening in a restrictor member 44, connects the intake opening 27' with a nozzle 45. The passageway 43 at a point directly adjacent the nozzle 45 is connected by a vertical channel 46 to the interior of the casing 27.

Pivotally supported by a bracket 47 secured to the casing 27 is a flapper 48 which is so balanced that it normally tends to lean against the discharge end of the nozzle 45 and thereby at certain times and under certain conditions closes the orifice in the latter. A spring may be employed to urge the flapper in a direction toward the nozzle if such a construction is preferred.

Secured to the lever arm 20 is an upstanding bar 49 which is so positioned that its upper rounded end is adapted to actuate the flapper 48 away from the nozzle 45 when the lever arm 20 is moved in a counterclockwise direction by the downward movement of the float 5. An adjustable screw 50 passing through the bar 49 and threaded into a stationary projection secured to the lever arm 20 serves to adjust the position of the rounded upper end of the said bar so that the flapper's movement from the nozzle may be effected immediately upon the commencement of the counterclockwise movement of the lever arm 20 or slightly thereafter.

So as to provide means for partially absorbing the shocks incident to the movement of the operating lever arm 20 in either direction, I have secured the opposite ends of two interconnected bellows 51 and 52 to two stationary supports 53. The adjacent ends of the bellows are secured to a rigid member 54 which is secured as by a screw to the free end of the operating arm, and a restricted passageway 55 extending through the said member connects the interiors of the two bellows so that a non-freezing and non-compressible fluid of known viscosity located in the bellows may flow from one to another as first one is collapsed while the other is expanded, and vice versa. This combination produces a hydraulic damping effect, since being filled with a non-compressible fluid the reaction of one bellows to another is entirely dependent upon the flow of fluid between them, and thus sudden and erratic changes in the applied force to one bellows reacts on the other in an average and reduced intensity.

In the diagrammatic illustration shown in Fig. 7 the outlet pipe 42 is connected to means 56 for indicating the liquid level of the fluid in a pressure vessel 2 and to means 57 for recording and/or controlling the said level. The controlling means is connected to a control valve 58 which in turn is connected in the outflow line 59 leading from the pressure vessel. Thus by automatically regulating the outflow of the fluid from the vessel 2, the level thereof in the said vessel may also be automatically regulated.

Before the vessel 2 is filled with liquid, the proper balance and adjustment of the apparatus is made by first providing a tension on the spring 22 sufficient to support the suspended weight of the float 5 and the rod 12. At such a point of adjustment the torsional point of the torsion tube 16 is at zero and the tension on the spring 22 merely represents the mechanical dead weight of the float, the rod 12 and the interconnecting parts. The inflow of liquid to the vessel 2 upon rising around the float causes an upward thrust thereon in direct proportion to the weight of the liquid displaced by the float. With an upward thrust being applied to the float there is imparted through the rod 12, the fulcrum block 13 and the shaft 17, a force tending to rotate the operating lever arm 20 in a clockwise direction. As the lever arm is so actuated, the upstanding bar 49 is carried in a direction whereby the flapper 48 is allowed to drop toward the nozzle 45, thereby immediately causing a restriction to the free flow of air from the said nozzle. A back pressure is set up in the passageway 43 and the air thereupon commences to flow through the channel 46 into the interior of the casing 27 where it applies an external force upon the large bellows 37, thereby causing the latter to partially collapse and actuate the tubular member 35 in an upward direction. Upon the said tubular member 35 being actuated upwardly, the valve member 33 is unseated and the air is thereupon allowed to proceed from the opening 27' into the small bellows 36, from whence it proceeds through the pipes 39 and 26 into the bellows 25. The bellows 25 upon being thereby expanded exerts an upward force on the operating lever arm 20 which tends to react directly against the upward thrust of the float 5. With the area of the bellows 25 being predetermined and fixed, the amount of the fluid pressure necessary to resist the downward force of the spring 22 due to the reduction in the effective weight of the float because of the change in the liquid level in the vessel, would be directly proportional to the applied force of the spring. Inasmuch as it requires but approximately .002 of an inch of movement of the flapper 48 to produce a back pressure in the pilot device 27 and the bellows 25 equivalent to the total displacement of the float 5, it is obvious that the required torsion of the torsion tube 16 and the total rotation of the shaft 17 is practically zero. Due to the very slight rotation required of the shaft and since the torsion tube 16 follows the law of springs in its torsion, it is evident that the effects of friction are practically eliminated, and therefore it is reasonable to conclude that the actual pressure necessary to react against the downward force applied by the spring 22 because of the decreased effective weight of the float due to the submergence thereof is directly proportional to the weight of the displaced liquid.

In effect bellows member 25 absorbs or discharges all changes in exerting force on spring 22 as resulting from variations in level about float 5 thus being a constant measure of these changes. The fluid pressure exerted internally on the area of small bellows 36 ultimately equals the fluid pressure exerted externally on the area of the large bellows 37 which through the tubular member 35 causes the valve 33 to close. The relative exerting forces of the elastic bellows 36 and 37 are proportional directly to their areas at a point of balance and when valve 33 is closed.

Established relative fluid pressures in the small bellows 36 is transmitted through the outlet pipe 39 to the bellows 25 which engages with operating lever arm 20 and tends to resist the downward force by the spring 22 upon the said lever arm.

The gauge 41 being connected to the pipe 39 is adapted to be actuated by the air pressure operating thereon so as to indicate the level of the liquid in the vessel 2. The air proceeding under pressure through the pipe 42 may be directed to suitable instruments 56 and 57 which are capable of indicating, recording and controlling the level of the liquid in the vessel.

When the liquid level in the vessel 2 recedes, the effective weight of the float increases and this force together with the upward balancing force exerted upon the lever arm 20 by the bellows 25, causes the counterclockwise movement of the said arm and the consequent compression of the spring 22. The bar 49 being carried by the lever arm in the same direction forces the flapper 48 away from the nozzle 45, thereby causing a reduction in the fluid pressure in the passageway 43, in the orifice 46 and in the chamber of the casing 27. The fluid pressure having been previously balanced in the chambers of the small and large bellows 36 and 37, allows the elasticity thereof to bring about their normal expansion, thereby causing the tubular member 35 to leave the end of the valve stem 34. The consequent opening of the fluid port in the tubular member 35 allows the fluid under pressure in the small bellows 36 to escape into the chamber of the large bellows 37 and thence through the vent 38 to atmosphere. The reduction of the fluid pressure first in the chamber of the small bellows and then in the lines 39, 26 and 42, will be reflected by the instruments 41, 56 and 57.

Extending through an enlarged opening 20' in the operating lever arm 20 is a stationary screw 60 which serves to indicate the normal operating position of the lever arm and to prevent a destructive abnormal movement of the said arm in the event of a sudden drop of the float due to the breaking of the spring 22 or its upper support.

When the device is used to indicate specific gravity, the float 5 is immersed to a predetermined depth in the liquid contained in the cylinder 1.

Having described my invention, what I claim is:

1. In apparatus of the class described, a float having a predetermined weight; a liquid containing vessel in which the float is positioned; a rod connected at one end to the float and at its opposite end to a fulcrum block; a torsion tube disposed at approximately right angles to the rod and secured at one end to the block and at its opposite end a stationary bushing; a tubular member closed at one end by the bushing and supporting at its opposite end the fulcrum block; a rotatable shaft extending through the torsion tube having one end rigidly secured to the end of the torsion tube which is secured to the block and its opposite end projecting beyond the opposite end of the said torsion tube; a substantially horizontal operating lever arm rigidly secured at one of its ends to that end of the shaft which projects beyond the end of the torsion tube; a tension spring engaging with the lever arm and exerting a downward force thereon approximately equal to the dead weight of the float, the rod and their interconnected parts; a bellows positioned to engage with the underneath side of the lever arm; a pilot control device having a fluid inlet and a fluid outlet, the said outlet being connected to a fluid pressure indicator adapted to indicate the liquid level of the liquid in the vessel and to the bellows; fluid discharge means on the pilot control device connected to the fluid inlet; throttling means responsive to the movement of the operating lever arm for controlling the flow of fluid through the discharge means, the said throttling means being adapted to restrict the flow of fluid through the discharge means in proportion to the increased weight of the liquid displaced by the float; and means embodied in the pilot control device for increasing or decreasing the flow of fluid to the outlet in proportion to the decrease or increase of the flow of the fluid from the discharge means as controlled by the throttling means.

2. In apparatus of the class described, a liquid containing vessel; a float of predetermined weight positioned in the vessel; a pivoted lever arm; means connecting the float and the lever arm, whereby the lever arm may be moved about its pivot in accordance with the rise or fall of the float due to the increase or decrease of the weight of the liquid the float displaces; spring means for exerting a force upon the lever arm substantially equivalent to and opposed to the dead weight of the float; a fluid expansible member positioned to exert a force upon the lever arm in a direction opposing the force exerted by the spring means; a pilot control device having a fluid inlet and a fluid outlet, the said inlet being connected to source of pressure fluid and the said outlet being connected to the expansible member and to an indicating device sensitive to fluid pressure changes; fluid discharge means on the pilot control device; throttling means responsive to the movement of the lever arm for restricting the flow of fluid through the discharge means in proportion to the increase of the weight of the liquid displaced by the float; and control means embodied in the pilot control device for increasing the flow of fluid to the outlet in proportion to the decrease in the flow of the fluid from the discharge means.

3. In apparatus of the class described, a liquid containing vessel; a float of predetermined weight positioned in the vessel; a pivoted lever arm; means connecting the float and the lever arm, whereby the lever arm may be moved about its pivot in accordance with the amount of liquid the float displaces; spring means for exerting a force upon the lever arm in a direction tending to counteract the force exerted by the dead weight of the float in the opposite direction; a fluid expansible member positioned to engage with the lever arm and adapted to exert a force thereon in a direction opposed to the force exerted by the spring means; a pilot control device having a fluid inlet connected to a source of fluid pressure and an outlet connected to the said expansible member and to an indicator, recorder or controller which is sensitive to changes in fluid pressures; a fluid discharge means on the pilot control device connected to the inlet; throttling means responsive to the movement of the lever arm for restricting the flow of fluid through the discharge means in proportion to the increase of the weight of the liquid displaced by the float; means embodied in the pilot control device for increasing the flow of fluid to the outlet in proportion to the decrease in the flow of the fluid from the discharge means; and means associated with the lever arm for preventing its pivotal movement beyond certain limits.

4. In apparatus of the class described, a liquid containing vessel; a float of predetermined weight positioned in the vessel; a rod from which the float is suspended; a rotatable shaft secured to and positioned at right angles to the rod, the said shaft being adapted to be rotated by the change in elevation of the float due to the increased or decreased weight of the liquid the float displaces; an operating lever arm secured at one end to the shaft; spring means for exerting a force upon the lever arm in a direction opposed to and substantially counteracting the force applied by the dead weight of the float, the rod and its interconnected parts; a fluid expansible member positioned to engage with the lever arm and adapted to exert a force thereon in a direction opposed to the force exerted by the spring means; a pilot control device having a fluid inlet connected to a source of fluid pressure and an outlet connected to the said expansible member and to a fluid pressure indicator; a fluid discharge nozzle connected to the fluid inlet; throttling means responsive to the movement of the lever arm for restricting or increasing the flow of fluid through the nozzle in proportion to the increase or decrease in the weight of the liquid displaced by the float; means in the pilot control device for increasing or decreasing the flow of fluid from the inlet to the outlet in proportion to the decrease or increase of the flow of fluid through the nozzle.

5. In apparatus of the class described, a liquid containing vessel; an elongated float of predetermined weight suspended in a vertical position in the vessel; a rod from which the float is suspended; a rotatable shaft secured to and positioned at right angles to the rod, the said shaft being adapted to be rotated by the change in elevation of the float due to the increased or decreased weight of the liquid the float displaces; a substantially horizontal operating lever arm secured at one end to the shaft and adapted to be moved with the shaft as a pivot when the float is raised or lowered; spring means for exerting a downward force on the lever arm opposed to and substantially counteracting the force applied by the dead weight of the float, the rod and their interconnected parts; a fluid expansible member positioned to exert an upward force on the lever arm; a pilot control device having a fluid inlet connected to a source of fluid pressure and an outlet connected to the said expansible member and to an indicating, controlling or recording device sensitive to changes in flund pressures; a fluid discharge nozzle connected to the fluid inlet; throttling means responsive to the movement of the lever arm for restricting or increasing the flow of fluid through the nozzle in proportion to the increase or decrease in the weight of the liquid displaced by the float; control means in the pilot control device, sensitive to the change of fluid pressure thereon caused by the increased or decreased flow of fluid through the nozzle, for increasing or decreasing the flow of fluid from the inlet to the outlet in proportion to the decrease or increase of the flow of fluid through the nozzle.

6. In apparatus of the class described, a liquid containing vessel; an elongated float of predetermined weight suspended vertically in the vessel; a pivoted lever arm; means connecting the float and the lever arm, whereby the lever arm may be moved about its pivot in accordance with the vertical movement of the float due to the increased or decreased weight of the liquid the float displaces; spring means for exerting a force in a certain direction upon the lever arm substantially equivalent to and opposed to a force exerted by the dead weight of the float; a fluid expansible member positioned to exert a force upon the lever arm in a direction opposed to the force exerted by the spring means; a pilot control device having a fluid inlet connected to a source of fluid pressure and an outlet connected to the said exponsible member and to an indicating, controlling or recording device sensitive to changes in fluid pressure; a fluid discharge means connected to the fluid inlet; throttling means responsive to the movement of the lever arm for restricting the flow of fluid through the discharge means in proportion to the weight of the liquid displaced by the float; control means in the pilot control device for increasing the flow of fluid to the outlet in proportion to the decrease in the flow of the fluid through the discharge means; and damping means associated with the lever arm tending to retard the pivotal movement of the latter in either direction.

7. In apparatus of the class described, a pivoted member adapted to be moved in a certain direction by the increase in the effective weight of a float connected thereto, and in the opposite direction by spring means having a tension normally balancing the dead weight of the float; fluid expansible means for exerting a pressure upon the pivoted member in a direction opposing the force exerted by the spring means; a pilot control device having a fluid inlet connected to a source of pressure fluid and a fluid outlet connected to the fluid expansible means and to a device responsive to changes in fluid pressures; and means responsive to the pivotal movement of the pivoted member for causing the pilot control device to increase the flow of the pressure fluid from the inlet to the outlet in proportion to the decrease in the effective weight of the float.

8. In apparatus of the class described, a pivoted member adapted to be moved in a certain direction by the increase in the effective weight of a float connected thereto, and in the opposite direction by spring means having a tension normally balancing the dead weight of the float; fluid expansible means for exerting a pressure upon the pivoted member in a direction opposing the force exerted by the spring means; a pilot control device having an inlet connected to a source of pressure fluid and a fluid outlet connected to the fluid expansible member and to a device responsive to changes in fluid pressures; a fluid discharge nozzle on the pilot control device connected to the fluid inlet and to the fluid outlet; means responsive to the pivotal movement of the pivoted member for controlling the discharge of fluid from the nozzle, whereby upon the pivoted member being moved in a certain direction by the decreased effective weight of the float the fluid discharged by the nozzle will be decreased and the flow of fluid from the outlet will be proportionately increased, and when the spring means actuates the pivoted member in the opposite direction due to the float increasing in effective weight, the fluid flow through the nozzle will be increased and the fluid flow from the outlet will be proportionately decreased.

9. In apparatus of the class described, a pivoted member adapted to be moved in a certain direction by the increase in the effective weight of a float connected thereto and in the opposite direction by spring means having a tension normally balancing the dead weight of the float; fluid expansible means for exerting a pressure upon the pivoted member in a direction opposing the force exerted by the spring means; a pilot control device having a fluid inlet connected to a source of pressure fluid and a fluid outlet connected to the fluid expansible means and to a device responsive to changes in fluid pressures; a fluid discharge nozzle on the pilot control device having its orifice connected to the fluid inlet and to the fluid outlet; control means responsive to changes in fluid pressure within the pilot control device interposed between the nozzle and the fluid outlet; and means responsive to the pivotal movement of the pivoted member for decreasing the flow of pressure fluid from the nozzle as the float decreases in effective weight and for increasing the said flow from the nozzle as the said effective weight increases, whereby the fluid pressure in the pilot control device may be increased or lessened and the control means may be actuated to control the flow of fluid through the outlet.

10. In apparatus of the class described, a liquid containing vessel; a float of predetermined weight suspended in the vessel; a pivoted lever member responsive to changes in the effective weight of the float as determined by variations in the physical characteristics of the liquid in the vessel which the float displaces; spring means for exerting a force upon the lever member in a direction opposed to the force exerted by the weight of the float; a fluid expansible member adjustably positioned to exert a variable force upon the lever member in a direction opposed to the force exerted by the spring means; a pilot control device having a fluid inlet connected to a source of pressure fluid and an outlet connected to the expansible member and to a device responsive to changes in fluid pressures; and means responsive to the pivotal movement of the lever and associated with the pilot control device for controlling the flow of fluid through the fluid outlet.

11. In apparatus of the class described, a pivoted member adapted to be moved in a certain direction by the increase in the effective weight of a float connected thereto, and in the opposite direction by expansible means exerting a force normally balancing the dead weight of the float; fluid expansible means for exerting a pressure upon the pivoted member in a direction opposing the force exerted by the expansible means; a pilot control device having an inlet connected to a source of pressure fluid and a fluid outlet connected to the fluid expansible member and to a device responsive to changes in fluid pressures; fluid discharge means on the pilot control device connected to the fluid inlet; means responsive to the pivotal movement of the pivoted member for controlling the discharge of fluid from the discharge means, whereby upon the pivoted member being moved in a certain direction by the decreased effective weight of the float the fluid discharged by the discharge means will be decreased and the flow of fluid from the outlet will be proportionately increased, and when the expansible means actuates the pivoted member in the opposite direction due to the float increasing in effective weight the fluid flow through the discharge means will be increased and the fluid flow from the outlet will be proportionately decreased.

DOUGLAS H. ANNIN.